June 30, 1931.  J. H. PRATT ET AL  1,811,863
COOLER CABINET
Filed March 6, 1926  2 Sheets-Sheet 1

Inventor:
Jabez H. Pratt,
Franklin B. Hunt,
By Rector, Hibben, Davis & Macauley
Attys.

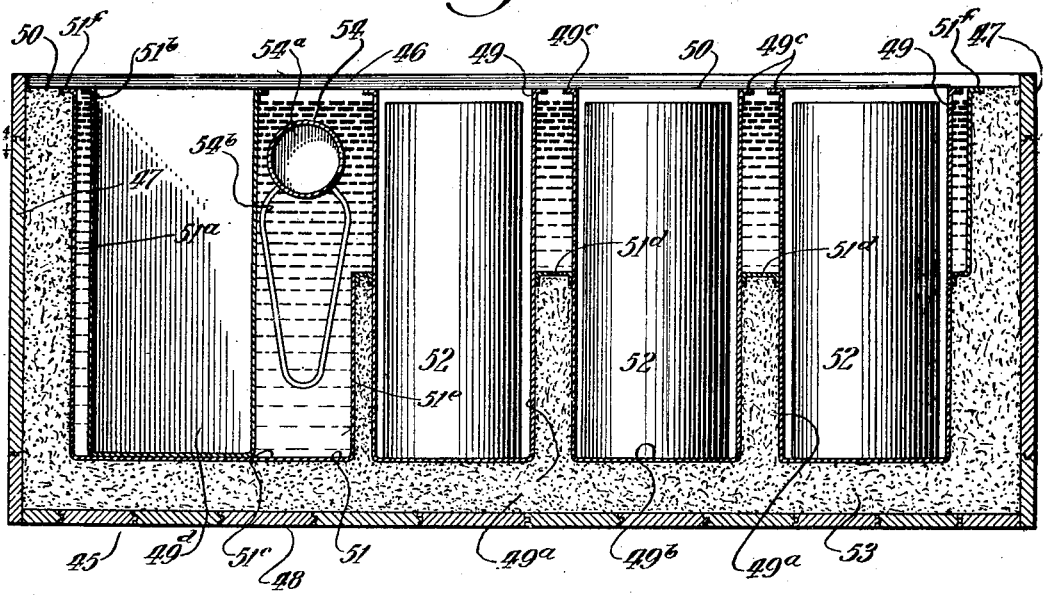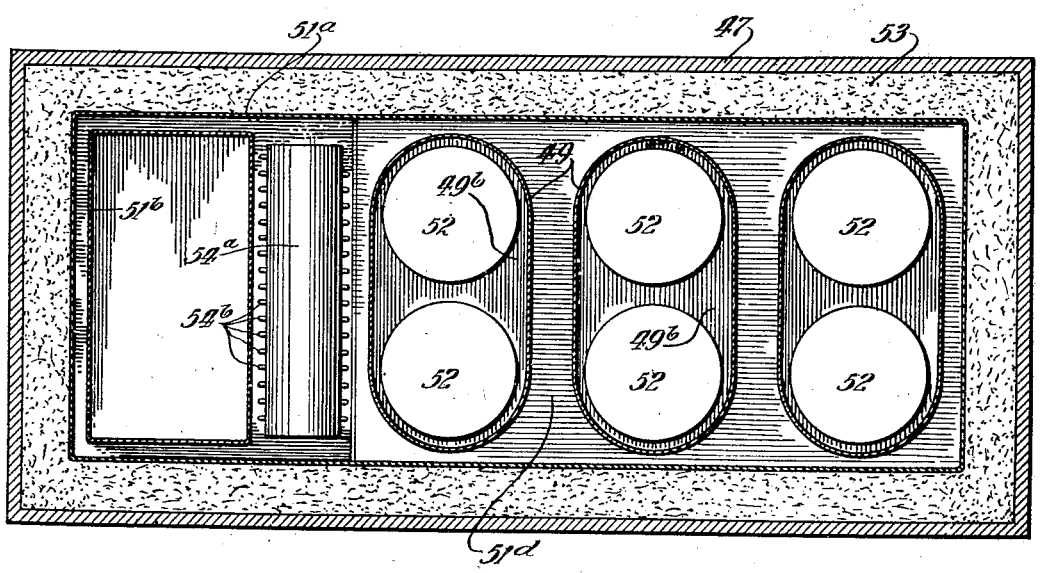

Patented June 30, 1931

1,811,863

UNITED STATES PATENT OFFICE

JABEZ H. PRATT AND FRANKLIN B. HUNT, OF CHICAGO, ILLINOIS, ASSIGNORS, BY MESNE ASSIGNMENTS, TO THE LIQUID CARBONIC CORPORATION, OF CHICAGO, ILLINOIS, A CORPORATION OF DELAWARE

COOLER CABINET

Application filed March 6, 1926. Serial No. 92,744.

This invention relates to improvements in cooler cabinets and its purpose is to provide improved means for keeping and maintaining ice cream and the like at low temperatures at soda fountains and other places where ice cream is sold. In the operation of cooler cabinets and soda fountains, great difficulty has heretofore been encountered in maintaining ice cream and the like at the proper temperature, particularly in maintaining a substantially uniform temperature throughout the depth of the vessel or container in which the ice cream is kept. In those cooler cabinets in which the receptacle for the ice cream container is surrounded by a brine or other cooling medium, it has been found that if the refrigerating apparatus for the cabinet is operated to maintain a sufficiently low temperature adjacent the tops of the ice cream containers, the ice cream at the bottom of those containers is too hard and cold, whereas if the refrigerating apparatus is operated to maintain a suitable temperature at the bottom of the cans, the ice cream adjacent the top thereof is too soft to be served to the public. It is therefore the principal object of this invention to provide an improved cooler cabinet having means for maintaining a substantially uniform temperature throughout the depth of the ice cream receptacle. A further object is to provide means for maintaining different substantially uniform temperatures throughout the depth of different receptacles of the cabinet. Other objects of the invention relate to various features of construction and arrangement which will appear more fully hereinafter.

Figure 2:
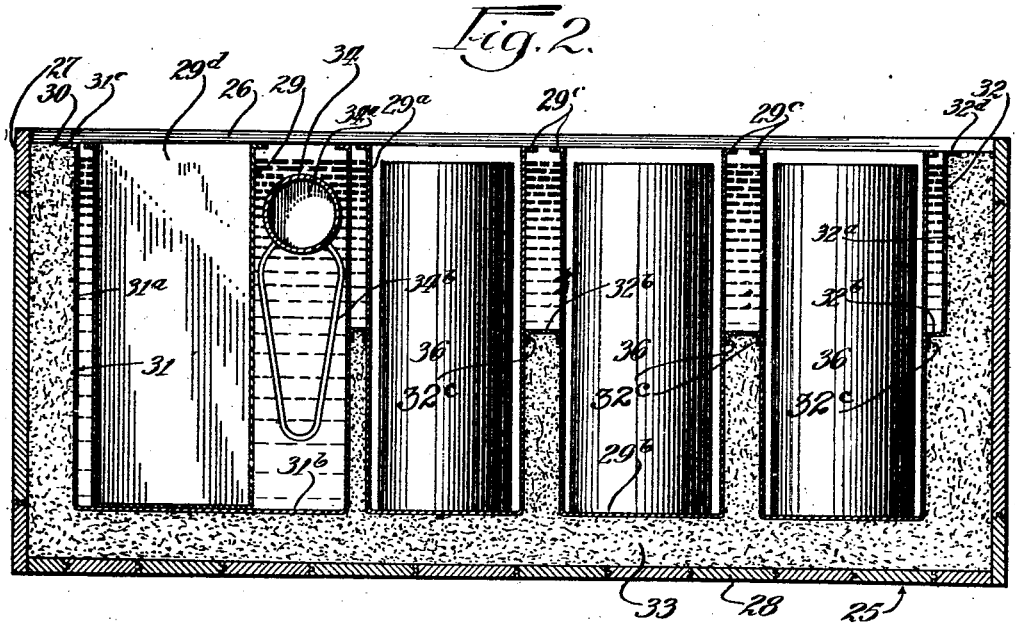
Figure 1:
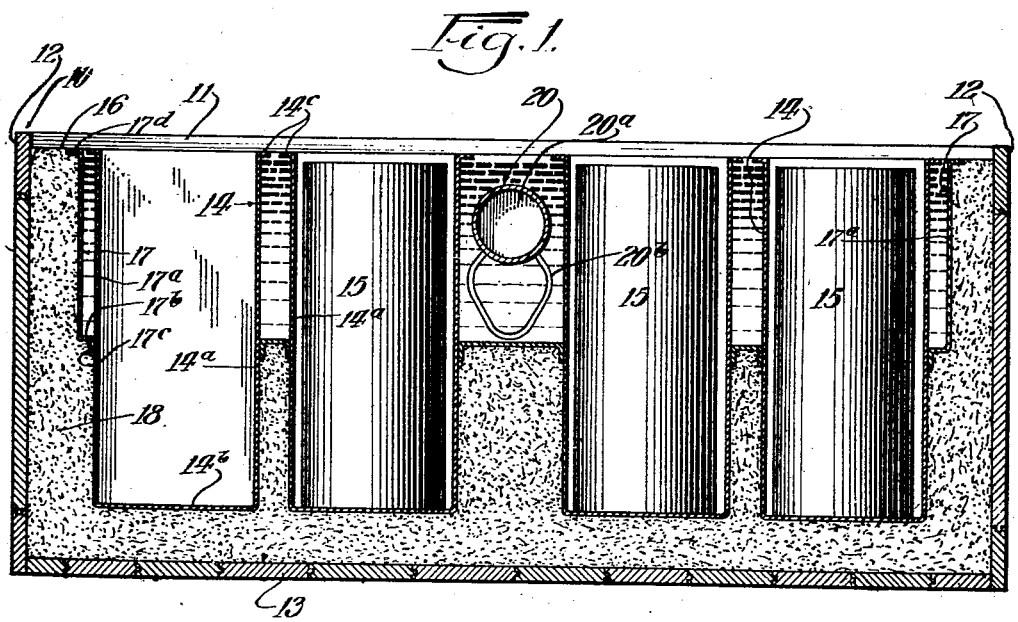

The nature of the invention will be understood from the following specification taken with the accompanying drawings in which certain embodiments are illustrated. In the drawings, Figure 1 shows a longitudinal section through an ice cream cabinet embodying the features of the present invention; Fig. 2 shows a similar longitudinal section through another ice cream cabinet showing another form of the invention; Fig. 3 is a longitudinal vertical sectional view through another cooler cabinet illustrating a modification in which the cooling of all of the receptacles is effected by a common brine tank; and Fig. 4 shows a horizontal section on the line 4—4 of Fig. 3, it being understood that the receptacles and containers of all forms of the invention are similar in shape.

Referring to Fig. 1 of the drawings, the improved ice cream cabinet or cooler box comprises an outer casing 10 comprising longitudinal side walls 11, end walls 12, and a bottom wall 13. These walls may be formed of wood or slate or marble, or combinations of these materials and they form an enclosure in which are mounted a plurality of ice cream receptacles 14 which are arranged side by side longitudinally of the cooler cabinet, forming a number of separate compartments, each adapted to receive one or more ice cream containers 15. The receptacles 14 may be oval or circular or rectangular in cross-section, their side walls $14^a$ extending vertically and the bottom walls $14^b$ being spaced somewhat above the bottom wall 13 of the cabinet. The upper parts of the vertical walls $14^a$ of the ice cream receptacles are provided with laterally projecting flanges $14^c$ which may be secured to the top capping 16. A brine tank 17 sourrounds all of the ice cream receptacles 14 in the upper parts thereeof, this brine tank having a vertical wall $17^a$ connected at its lower end to a horizontal bottom wall $17^b$ which is perforated to receive the downwardly projecting ice cream receptacles 14, flanges $17^c$ being provided around these perforations for connection with the lateral or vertical walls of the containers. The upper edges of the vertical wall $17^a$ are provided with outwardly directed flanges $17^d$ which are connected to the top capping 16. There is thus provided a brine tank which extends preferably throughout substantially one-half the depth of the ice cream containers 14. The space between the brine tank 17 and the surrounding walls of the cabinet 10 and the spaces between adjacent ice cream containers and between the bottoms of those containers and the bottom wall of the container, are all filled by cork or other suitable heat insulating material 18. The brine or other cooling medium contained within the brine tank 17 and around the upper portions of the ice cream receptacles 14 is cooled by a suitable refrigerating device 20, commonly known as a "boiler," comprising an upper cylindrical vessel 20$^a$ having connected thereto a plurality of downwardly projecting circulating pipes 20$^b$. This cooling device is connected with suitable refrigerating apparatus adapted to circulate therethrough and to cause the vaporization therein of a suitable refrigerating medium such as sulphur dioxide, for example. The vaporization of the sulphur dioxide or other refrigerant in the boiler 20 is adapted to maintain at the desired temperature the brine in the tank 17 and by suitably operating the refrigerating apparatus to maintain the temperature of the ice cream in the upper parts of the ice cream containers 15 at a temperature suitable for serving, it is found that substantially the same temperature is maintained throughout the depth of the ice cream within the cans 15, there being a sufficient transfer of heat through the metal walls of the receptacles 14 which are surrounded by the heat insulating material. This substantially uniform temperature is maintained throughout the depth of each ice cream container 15 until all of the ice cream has been served therefrom and the difficulties which have heretofore been encountered in the operation of ice cream cabinets are effectually overcome.

A modified form of the invention is illustrated in Fig. 2 of the drawings which illustrates a longitudinal vertical section through an ice cream cabinet 25 having outer vertical longitudinal walls 26, vertical end walls 27 and a bottom wall 28 forming an outer enclosure in which there are mounted a plurality of ice cream receptacles 29 formed preferably of metal. The ice cream receptacles 29 may be oblong or circular or rectangular in cross-section and each receptacle comprises vertical walls 29$^a$ and a bottom wall 29$^b$ spaced upwardly from the bottom wall 28 of the outer casing. The vertical walls 29$^a$ are provided with outwardly directed flanges 29$^c$ which are secured to the top capping 30 of the cabinet. In this construction one of the ice cream receptacles 29$^d$ is mounted within a brine tank 31 which has its vertical walls 31$^a$ spaced from the vertical walls 29$^a$ of this receptacle and which has a bottom wall 31$^b$ extending beneath and in close contact with the bottom wall of the receptacle 29$^d$. The vertical walls 31$^a$ of the brine tank 31 have outwardly directed flanges 31$^c$ which are connected to the top capping 30. In addition to the brine tank 31, there is provided another brine tank 32 which surrounds all of the other ice cream receptacles 29 and which is separated at one end from the tank 31 by the common intervening vertical wall 31$^a$ of the last mentioned brine tank. The brine tank 32 is provided with a bottom wall 32$^b$ which is spaced upwardly from the bottoms of the enclosed ice cream receptacles a distance equal preferably to substantially one-half the depth of those receptacles, this bottom wall being provided with apertures to receive the receptacles and having downwardly directed flanges 32$^c$ which are secured to the vertical receptacle walls. The vertical walls 32$^a$ of this brine tank 32 are provided with outwardly directed flanges 32$^d$ which are secured to the top capping 30. The spaces between adjacent receptacles 29 beneath the brine tank 32, the spaces beneath the ice cream receptacles and the brine tank 31, and the spaces between the brine tanks and receptacles and the outer vertical surrounding walls of the cabinet 25, are filled with cork or other suitable heat insulating material 33.

Both of the brine tanks 31 and 32 are adapted to contain a suitable brine or other cooling medium and this brine is maintained at the desired low temperature by means of a refrigerating device or boiler 34 comprising an upper cylindrical vessel 34$^a$ having communicating therewith a plurality of cooling or circulating tubes 34$^b$ which extend downwardly into the brine in the tank 31 in the space between the receptacle 29$^d$ and one of the vertical walls of the brine tank which is in contact with the adjacent wall of the brine tank 32. The brine in the tank 32 is cooled by the transfer of heat through the common intervening wall 31$^a$ which separates the two brine tanks to the brine contained in the tank 31 which in turn is cooled by direct contact with the cooling coils of the refrigerating device 34. Suitable refrigerating apparatus is connected to the device 34 to effect the circulation therethrough and the vaporization therein of a suitable refrigerant such as sulphur dioxide, for example. It will be observed that in this embodiment of the invention the brine extends downwardly around the receptacle 29$^d$ to the bottom thereof and that the circulating coils 34$^b$ of the refrigerating device are similarly elongated downwardly so that they extend into the lower part of the brine. By this arrangement, a very low temperature can be maintained in the receptacle 29$^d$, suitable for the preservation at a low temperature of bricks of ice cream, it being understood that brick ice cream should preferably be maintained at a comparatively low temperature due to the fact that it is usually not consumed until taken to the homes of the customers. On the other hand, the usual bulk ice cream is ordinarily served and consumed on the premises in which the cooler cabinet or soda fountain is located, and the receptacles 29 which are surrounded by the other brine tank 32 are adapted to maintain this bulk ice cream at a suitable temperature for immediate service to the customers. The higher temperature of the brine in the tank 32 arises from the fact that its brine is cooled by transfer of heat through the metal walls to the brine in the tank 31 and this somewhat higher temperature which is maintained in the receptacles surrounded by the brine tank 32 is substantially uniform throughout the depth of those receptacles so that the ice cream contained within the can 36 is preserved at substantially the same temperature throughout the depth of the can until all of the ice cream has been served to the customers.

In the form of the invention illustrated particularly in Fig. 3, there is provided an ice cream cabinet 45 having outer vertical longitudinal walls 46, vertical end walls 47 and a bottom wall 48 forming an enclosure in which there are mounted a plurality of ice cream receptacles 49 formed preferably of sheet metal. The ice cream receptacles 49 may be oblong in cross-section as shown in Fig. 4 or they may have any other desired shape. Each receptacle comprises vertical walls $49^a$ and a bottom wall $49^b$, the bottom walls of the several receptacles being spaced upwardly from the bottom wall 48 of the cabinet. The vertical walls $49^a$ are provided with outwardly directed flanges $49^c$ which are secured to the top capping 50 of the cabinet. In this construction, one of the ice cream receptacles $49^d$ is of rectangular cross-section to receive ice cream in brick form and all of the receptacles extend downwardly into a common brine tank 51 having side walls $51^a$, end walls $51^b$ and two bottom wall sections $51^c$ and $51^d$ which are arranged at different elevations, being connected by the vertical wall section $51^e$. The brine tank 51 thus has two parts which are of different depth, the deeper portion being that in which the receptacle $49^d$ for the brick ice cream is located. The vertical walls of the brine tank have outwardly directed flanges $51^f$ which are connected to the top capping 50. All of the receptacles 49 are spaced inwardly from the vertical walls of the tank 51 so that the brine in the tank surrounds each of the receptacles. The receptacles for the bulk ice cream which is contained in the vessels 52 extend through the portion $51^d$ of the bottom wall of the brine tank so that these receptacles are surrounded in the upper portion thereof only by the cooling fluid in the brine tank. The lower portions of these receptacles beneath the wall section $51^d$ and the spaces between the brine tank and receptacles and the surrounding walls of the cabinet casing 45 are occupied by heat insulating material 53. A refrigerating device 54 is located in the tank 51, preferably in the deeper portion thereof, this cooling device comprising an upper cylindrical portion $54^a$ having connected thereto a plurality of cooling coils $54^b$ extending downwardly into the lower part of the tank. A suitable cooling medium such as sulphur dioxide may be caused to circulate to vaporize in the refrigerating device 54 in order to lower the temperature of the surrounding brine in the tank 51. With this form of the invention, the ice cream in the containers 52 is maintained at a substantially uniform temperature throughout the depth of the containers by reason of the arrangement of the cooling medium around the upper portions only of the receptacles in which those containers are located. Although all of the receptacles are cooled by the same brine, the receptacle $49^d$ for the brick ice cream is cooled throughout its depth and is located in close proximity to the refrigerating device 54 so that the brick ice cream is maintained at a lower temperature than the bulk ice cream in the other receptacles.

It will be understood that the ice cream receptacles of all embodiments of the invention are closed at the tops by suitable covers or lids which may preferably be formed in whole or in part of heat insulating material so that the entrance of heat from above is substantially prevented. By means of this invention, it is possible to overcome the difficulties heretofore encountered and to maintain ice cream at suitable uniform temperatures and at any desired temperature and by the use of the same refrigerating apparatus, ice cream of both bulk and brick forms may be maintained at different temperatures until all of the ice cream has been served or dispensed.

Although certain embodiments of the invention have been shown and described by way of illustration, it will be understood that it may be constructed in various other forms within the scope of the appended claims.

We claim:

1. A cooler cabinet comprising an outer casing, a brine tank mounted in said casing and having a pair of brine compartments of different depths, an ice cream receptacle located in one of said brine compartments, refrigerating means located in said brine compartment with said receptacle, and another ice cream receptacle extending downwardly into the other of said brine compartments and through the bottom wall thereof.

2. A cooler cabinet comprising an outer casing, a brine tank mounted in said casing and having a pair of brine compartments separated by a metal wall, an ice cream receptacle located in one of said brine compartments, refrigerating means located in said brine tank with said receptacle, another ice cream receptacle extending downwardly into the other of said brine compartments and through the bottom wall thereof, and heat insulating means surrounding the portion of said last named receptacle which extends beneath the bottom wall of its brine tank.

3. A cooler cabinet comprising an outer casing, a brine tank mounted in said casing and having a pair of brine compartments separated by a partition, an ice cream receptacle located in one of said brine compartments, refrigerating means located in said brine compartment with said receptacle, another ice cream receptacle extending downwardly into the other of said brine compartments and through the bottom wall thereof, heat insulating means surrounding the portion of said last named receptacle which extends beneath the bottom wall of its brine tank, and heat insulating material surrounding said brine tank within the said casing of the cabinet.

4. A cooler cabinet comprising an outer casing, a brine tank mounted in said casing and having a pair of brine compartments separated by a common metal wall, refrigerating means located in one of said compartments, said compartments being of different depths, an ice cream receptacle extending upwardly from the bottom wall of the brine compartment of greater depth, and a plurality of ice cream receptacles extending downwardly into the other of said brine compartments and through the bottom wall thereof, whereby the upper portions of said last-named receptacles are surrounded by the brine in the compartment of lesser depth.

5. A cooler cabinet comprising an outer casing, a brine tank mounted in said casing and having a pair of brine compartments of different depths, an ice cream receptacle located in one of said brine compartments, refrigerating means located in said brine compartment with said receptacle, and a plurality of ice cream receptacles extending downwardly into the other of said brine compartments through the bottom wall thereof and positioned at different distances from said refrigerating means.

6. A cooler cabinet comprising an outer casing, a brine tank mounted in said casing and having a pair of brine compartments separated by a metal wall, an ice cream receptacle located in one of said brine compartments, refrigerating means located in said brine tank with said receptacle, a plurality of ice cream receptacles extending downwardly into the other of said brine compartments through the bottom wall thereof and positioned at different distances from said refrigerating means, and heat insulating means surrounding the portion of said last-named receptacle which extends beneath the bottom wall of its brine tank.

7. A cooler cabinet comprising an outer casing, a brine tank mounted in said casing and having a pair of brine compartments separated by a common metal wall, refrigerating means located in one of said compartments, said compartments being of different depths, an ice cream receptacle extending upwardly from the bottom wall of the brine compartment of greater depth, and a plurality of ice cream receptacles extending downwardly into the other of said brine compartments through the bottom wall thereof and positioned at different distances from said refrigerating means.

In testimony whereof, we have subscribed our names.

JABEZ H. PRATT.
FRANKLIN B. HUNT.